United States Patent Office 3,172,789
Patented Mar. 9, 1965

3,172,789
FLUX FOR BRAZING REFRACTORY
CARBIDE COMPACTS
Joseph F. Quaas, Island Park, N.Y., and Daniel D. Zielik, Fairfield, Conn., assignors to Eutectic Welding Alloys Corporation, Flushing, N.Y., a corporation of New York
No Drawing. Filed Dec. 8, 1961, Ser. No. 158,135
5 Claims. (Cl. 148—26)

This invention relates to a flux for facilitating the brazing of compacts of refractory carbide particles to tool shanks, and it more particularly relates to such a flux for brazing compacts incorporating cobalt, nickel and molybdenum and the like in their binders.

Various refractory carbides such as titanium, tungsten, chromium and vanadium carbides are used to form the cutting edges of tools by forming them into compacted bodies and attaching these bodies to the shanks of the tools. These compacts are conventionally formed by sintering powders of these carbides with binders such as those containing cobalt, nickel and molybdenum and other similar metals. Although these compacts are extremely hard and tough, it is fairly difficult to securely attach them to the tool shanks which are usually made of steel even though highly effective brazing alloys such as silver base alloys are utilized.

An object of this invention is to provide a flux for brazing compacts of refractory carbide particles.

Another object is to provide such a flux for compacts incorporating cobalt, nickel and molybdenum and the like in their binders.

A further object is to provide such a flux for brazing such compacts with silver base alloys.

In accordance with this invention a highly effective flux for brazing refractory compacts includes the following constituents in the indicated ranges of percentages by weight.

Constituent: Range, percent
(1) Potassium hydrogen fluoride _____ 20–75
(2) Cobalt fluoride _____ 15–20
(3) A compound selected from the group consisting of cadmium, zinc and tin fluorides___ 4–25
(4) A compound selected from the group consisting of nickel fluoride and molybdenum oxide _____ 4–25

The third and fourth constituent can consist solely of any of the recited compounds or of any mixture of them. Cadmium fluoride is a particularly effective member of group (3).

A fourth constituent solely of nickel fluoride is particularly effective for use with compacts containing a relatively high percentage of nickel, and a fourth constituent which contains some or all of molybdenum oxide is particularly effective for a compound whose binder incorporates a relatively high amount of molybdenum.

The following is a description of a particularly effective example of the aforementioned flux.

Constituent: Percent by weight
(1) Potassium hydrogen fluoride _____ 48
(2) Cobalt fluoride _____ 30
(3) Cadmium, zinc or tin fluoride _____ approx. 10
(4) Nickel fluoride and/or molybdenum oxide ___ 12

The cobalt fluoride, nickel fluoride and molybdenum oxide in this formulation reduce very easily upon application of heat to provide reduced states of cobalt, nickel and molybdenum which alloy remarkably effectively with refractory carbide compacts such as those containing titanium carbide particles. The potassium hydrogen fluoride is an active scouring or cleaning agent which removes any oxides, dirt or grease deposits from the compact to allow the other constituents to effectively carry out their functions.

The cadmium, zinc or tin fluoride provide an easily reduced supply of salts of metals which provide an effective cover or blanket over the carbide particles to prevent its oxidation during the heating process. Cadmium fluoride in such a formulation also aids the flow and wetting ability of the brazing alloy such as a silver base alloy which is used to join the fluxed carbide compact to a tool shank such as a steel tool shank.

In utilizing such a flux, it is applied to a compact such as a titanium, tungsten, chromium or vanadium carbide compact cemented by a binder incorporating amounts of nickel and/or molybdenum. A titanium carbide compact employing a nickel binder is fluxed by the nickel fluoride type of the aforementioned flux also employing cadmium fluoride and heated, for example, by a gas torch to a temperature of approximately 2000 F. The reduced cobalt, nickel and/or molybdenum produced by the reaction that this flux undergoes with the compact when heated form a bond with the compact which is very superior to that obtained by relatively complicated and expensive processes such as electroplating because the reduced metals diffuse to a greater extent within the pores of the compact than can be accomplished by plating. The cadmium blanketing metal constituent protects the reduced alloys from adverse oxidation, and it promotes flow and wetting ability of the silver base alloy used for brazing the compact to a tool shank such as one made of steel. The potassium hydrogen fluoride cleaning agent and blanket constituent respectively clean the surface of the compact and protect the reduced metals as they are alloying with the binder. The released fluorides go over to the flux residue and also react with the hydrogen released from the potassium hydrogen fluoride to form hydrogen fluoride which has a remarkably effective cleansing effect. The fluorides eventually alloy with the binders of the compact with which they are highly compatible.

This flux is therefore remarkably effective in directly providing reduced cobalt, nickel and/or molybdenum which alloy extremely readily with cobalt, nickel and molybdenum-containing binders and the like in a reaction type having optimum compound densities and other physical characteristics which promote intermixture to form a powder or paste type flux having a long stable shelf life despite its remarkably great reactivity. This flux is operative at remarkably low temperatures to provide a deeply alloyed and diffused surface upon a refractory carbide compact which serves as a uniquely compatible interface for ultimate joinder with a brazing alloy, such as a silver base alloy, which joins it to a tool shank. Various copper base and brass alloys can also be used for brazing in conjunction with this flux.

Titanium carbide compacts are particularly difficult to braze because of the low wettability of the titanium carbide particles and their readily oxidized nature. A flux of the following composition is particularly effective for brazing such titanium carbide compacts with predominately nickel-containing binders:

| Constituent | Percent by Weight | |
|---|---|---|
| | Proportional Range | Example |
| (1) Potassium Hydrogen Fluoride | 20–75 | 48 |
| (2) Cobalt Fluoride | 15–50 | 30 |
| (3) Cadmium Fluoride | 4–25 | 10 approx. |
| (4) Nickel Fluoride | 4–25 | 12 |

A flux of this type which is particularly effective for brazing titanium carbide compacts having predominately molybdenum-containing binders, is formulated as follows:

| Constituent | Percent by Weight | |
|---|---|---|
| | Proportional Range | Example |
| (1) Potassium Hydrogen Fluoride | 20–75 | 46 |
| (2) Cobalt Fluoride | 15–50 | 29 |
| (3) Cadmium Fluoride | 4–25 | 9.5 |
| (4) Molybdenum Oxide | 4–25 | 15.5 |

For compacts whose binders contain mixtures of nickel and molybdenum, the constituent (4) contains approximately proportionate amounts of both nickel fluoride and molybdenum oxide.

What is claimed is:

1. A flux for brazing refractory carbide compacts having a binder containing nickel and molybdenum essentially consisting of the following constituents in the indicated ranges of percentages by weight:

Constituent—                   Proportional range
    Potassium hydrogen fluoride _____ 20–75
    Cobalt fluoride _____ 15–50
    A substance selected from the group consisting of cadmium, zinc and tin fluorides and mixtures thereof _____ 4–25
    A substance selected from the group consisting of nickel fluoride and molybdenum oxide and mixtures thereof _____ 4–25

2. A flux for brazing a refractory carbide compact having a binder incorporating an amount of nickel essentially consisting of the following constituents in the indicated ranges of percentages of weight:

Constituent—                   Proportional range
    Potassium hydrogen fluoride _____ 20–75
    Cobalt fluoride _____ 15–50
    Cadmium fluoride _____ 4–25
    Nickel fluoride _____ 4–25

3. A flux for brazing a refractory carbide compact having a binder incorporating an amount of molybdenum essentially consisting of the following constituents in the indicated ranges of percetnages by weight:

Constituent—                   Proportional range
    Potassium hydrogen fluoride _____ 20–75
    Cobalt fluoride _____ 15–50
    Cadmium fluoride _____ 4–25
    Molybdenum oxide _____ 4–25

4. A flux for brazing refractory carbide compacts having a binder containing nickel essentially consisting of the following constituents in the indicated ranges of percentages by weight:

Constituent—                   Proportional range
    Potassium hydrogen fluoride _____ 20–75
    Cobalt fluoride _____ 15–50
    A compound selected from the group consisting of cadmium, zinc and tin fluorides _____ 4–25
    Nickel fluoride _____ 4–25

5. A flux for brazing refractory carbide compacts, having a binder containing molybdenum essentially consisting of the following constituents in the indicated ranges of percentages by weight:

Constituent—                   Proportional range
    Potassium hydrogen fluoride _____ 20–75
    Cobalt fluoride _____ 15–50
    A compound selected from the group consisting of cadmium, zinc and tin fluorides _____ 4–25
    Molybdenum oxide _____ 4–25

References Cited in the file of this patent

UNITED STATES PATENTS

| 2,028,348 | Pier et al. | Jan. 21, 1936 |
| 2,731,362 | Brondyke | Jan. 17, 1956 |

FOREIGN PATENTS

| 761,277 | Great Britain | Nov. 14, 1956 |